United States Patent

[11] 3,561,518

| | | |
|---|---|---|
| [72] | Inventor | Harold A. Johnson<br>Norwood, Mass. |
| [21] | Appl. No. | 809,764 |
| [22] | Filed | Mar. 24, 1969 |
| [45] | Patented | Feb. 9, 1971 |
| [73] | Assignee | Mutron Corporation<br>Brockton, Mass.<br>a corporation of Massachusetts |

[54] FLEXIBLE WALL HAVING THROUGH ACCESSIBILITY
15 Claims, 5 Drawing Figs.

[52] U.S. Cl. ............................................. 160/87,
52/63, 128/1, 160/179, 160/327, 160/354
[51] Int. Cl. ........................................... E06b 3/80,
E04h 3/08
[50] Field of Search ............................................. 52/63, 240,
64; 135/1, 14D; 312/1, 3, 4, 209, 210, 292, 295,
291; 160/354, 327, 179, 328, 329, 237, 352, 87;
128/1.02, 1, 191

[56] References Cited
UNITED STATES PATENTS

| | | | | |
|---|---|---|---|---|
| 2,560,661 | 7/1951 | Poovey | | 160/179 |
| 2,748,854 | 6/1956 | Lynch | | 160/179 |
| 3,136,356 | 6/1964 | Mears | | 160/87 |
| 3,414,316 | 12/1968 | Williams et al. | | 160/179X |

OTHER REFERENCES
"WINTER QUARTERS FOR TOWSER", Popular Mechanics Magazine, Dec., 1962, page 147 - copy Gp 355 filed 160/354

*Primary Examiner*—Price C. Faw, Jr.
*Attorney*—Wm. W. Rymer

ABSTRACT: A wall structure comprising a pair of overlapping flexible sheets and three transversely spaced elastic bands, one being secured to each of the sheets adjacent the longitudinal edge thereof that overlies the other of the sheets and the third being secured to one of the sheets.

PATENTED FEB 9 1971    3,561,518

PATENTED FEB 9 1971

FLEXIBLE WALL HAVING THROUGH ACCESSIBILITY

This invention relates to isolation enclosures and, more particularly to wall structures thereof.

It is a primary object of the present invention to provide a wall structure which permits arm access into an isolation enclosure along the full length of the wall structure. Other objects include providing an isolation enclosure having a plurality of flexible and transparent wall structures of the type mentioned, which is simple to erect and disassemble, and in which the flexible and transparent walls are easily replaced.

The invention features a wall structure comprising a pair of overlapping flexible sheets and a pair of transversely spaced elastic bands, each band being secured to one of the sheets adjacent the longitudinal edge thereof that overlies the other sheets. In preferred embodiments there is featured an isolation enclosure including a pair of sidewalls each of which includes a pair of longitudinally spaced stanchions, a pair of overlapping sheets secured along their vertical edges to the stanchions, and five vertically spaced elastic bands (at least two of which are secured to each sheet) extending between the stanchions and a flexible end wall having a vertical edge thereof releasably engaging one of the stanchions to provide a door into the enclosure.

Other objects, features and advantages will appear from the following detailed description of a preferred embodiment of the invention, taken together with the attached drawings, in which.

Figures 1, 2, 3:
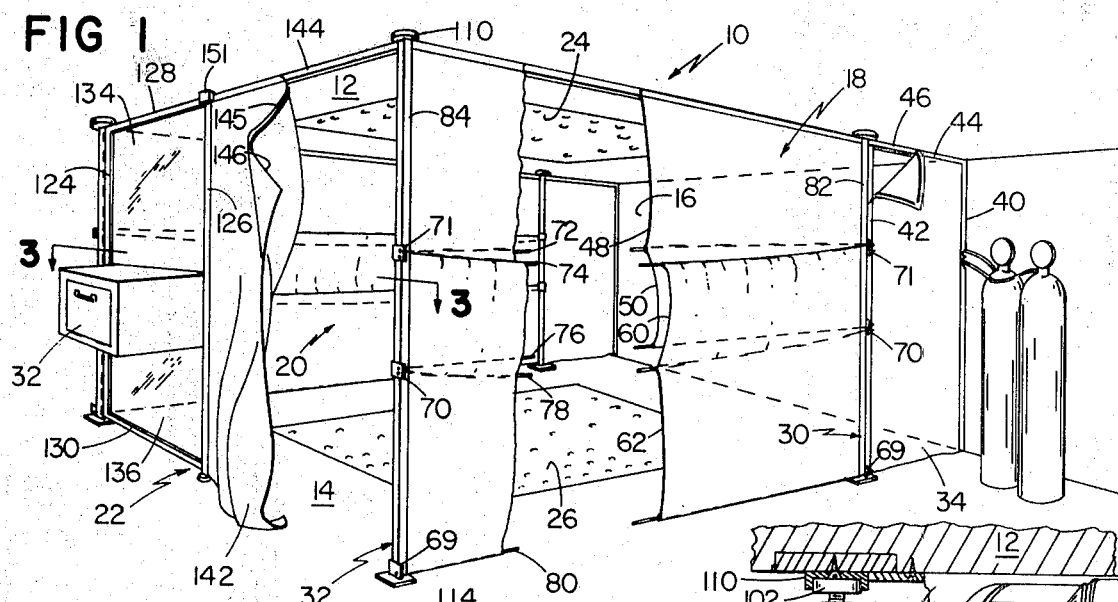
FIG. 1 is a perspective view, partially in section, of an isolation chamber embodying the present invention.
FIG. 2 is a side view, partially in section, of a portion of the enclosure of FIG. 1.
FIG. 3 is a sectional view taken along section 3—3 of FIG. 1.

Referring more particularly to the drawings, there is shown an isolation enclosure, generally designated 10, erected within a hospital room. The room itself provides the ceiling 12, floor 14 and end wall 16 of the isolation enclosure. The enclosure's two sidewalls 18 and 20 and other end wall 22, are removable. Sterile air is introduced into the enclosure through filters 24 in ceiling 12 and is withdrawn through plenums 26 in floor 14.

Sidewalls 18 and 20 are substantial mirror images of each other and only sidewall 18 will be described in detail. As shown, sidewall 18 includes a pair of square stanchions 30, 32, 7 feet tall and spaced 9 feet 6 inches apart, a rectangular sheet 34 extending between wall 16 and stanchion 30, and an access wall, including an upper curtain 36 and a lower curtain 38 mounted in a common vertical plane with adjacent portions overlapping, extending between stanchions 30 and 32.

Figure 4:
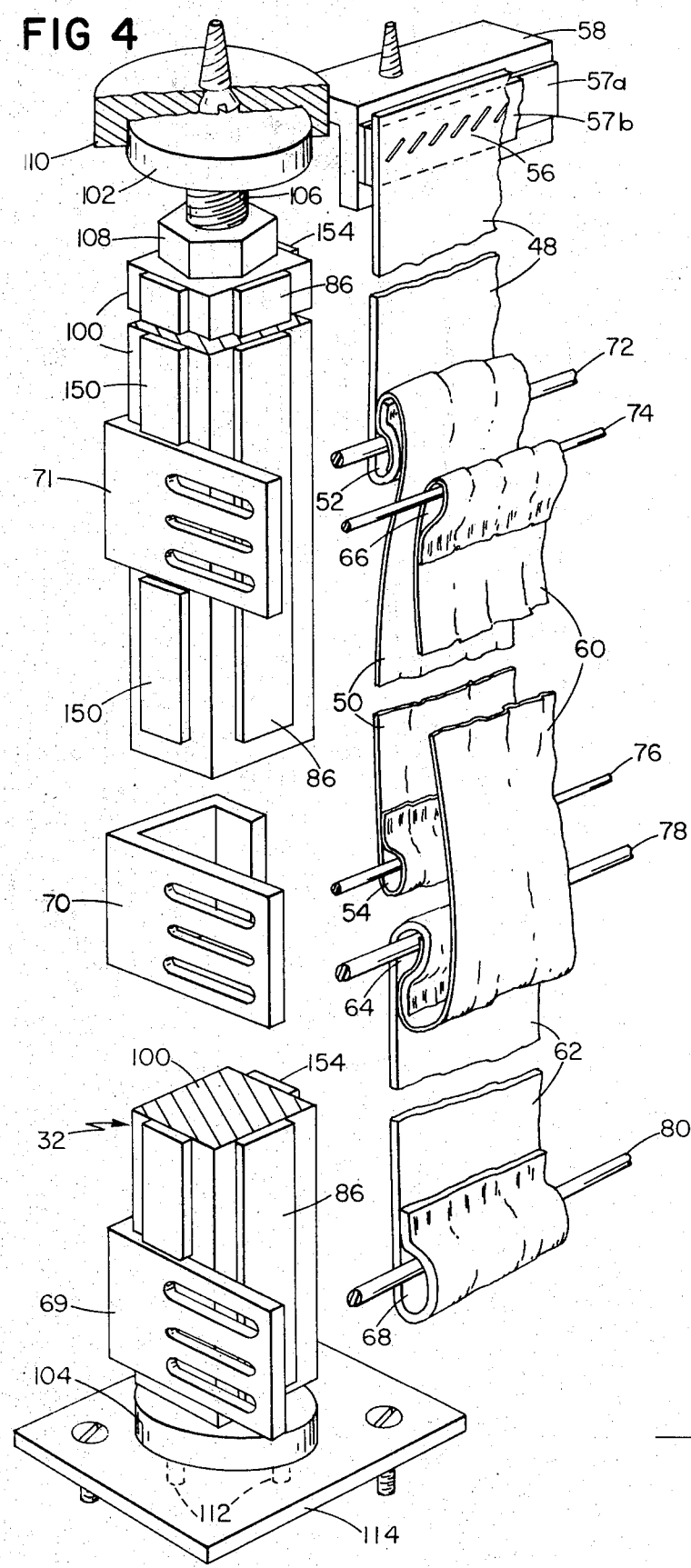
FIG. 4 is a perspective view, partially in section, of a corner portion of the enclosure of FIG. 1; and, FIG. 5 is a section view of an access wall of the enclosure of FIG. 1 illustrating the operation thereof.

As shown most clearly in FIGS. 2 and 4, stanchions 32 comprises a square aluminum rod 100 having circular discs 102, 104 mounted at its opposite ends. Disc 102 is secured to the upper end of rod 100 by a bolt 106 and nut 108 arrangement which provides for vertical adjustment of disc 102 relative to rod 100. To hold the stanchion in place, disc 102 is fitted within a cup 110 secured to ceiling 12. Disc 104 is welded to the lower end of rod 100. Three pins 112 extend vertically downwardly from disc 104 into mating holes in a plate 114 which is bolted to floor 14 and prevent both sliding and rotation of stanchion 32. The other three stanchions of enclosure 10 are similarly constructed, differing from each other chiefly in the manner in which the various flexible sheets forming the enclosure walls are secured thereto.

The vertical side edges 40 and 42 and top horizontal edge 44 of sheet 34 are secured, respectively, to wall 16, stanchion 30, and a strip 46 of aluminum moulding screwed to ceiling 12, by Velcro brand nylon fastening tape. The pile tape of each tape fastener is both cemented and stitched to sheet 34.

Upper curtain 36 of the access wall is made of two trapezoidal panels 48, 50 heat-sealed together at their juncture to form a longitudinal loop 52 extending horizontally the full length of the panels. The upper edge of panel 48 is 9 feet 6 inches long; its bottom edge is 10 feet in length. The upper and lower edges of panel 50 are, respectively, 10 feet and 10 feet 6 inches in length. A full-length, heat-seal formed longitudinal loop 54 is also provided at the lower horizontal edge of panel 50. The upper horizontal edge 56 of panel 48 is secured by a Velcro brand tape fastener to a strip 58 of aluminum moulding screwed to ceiling 12 and extending between stanchions 30, 32. As shown in FIG. 2, the tape fastener includes a hook tape 57a cemented to strip 58 and a pile tape 57b cemented and stitched to panel 48.

Lower curtain 38 similarly comprises two rectangular panels 60, 62, each 10 feet 6 inches in length, heat-sealed together at their juncture to form a full-length longitudinal loop 64. Full-length, heat-seal formed longitudinal loops 66, 68 are also provided, respectively, at the upper horizontal edge of panel 60 and the lower horizontal edge of panel 62.

Panel 50 of upper curtain 36 and panel 60 of lower curtain 38 are approximately 2 feet in width and overlap each other through most of their respective widths.

Three identical support clips, shown in detail in FIG. 4, are mounted on each of stanchions 30, 32. One clip 69 is mounted adjacent the foot of each stanchion, a second 70 is mounted approximately 3 feet from floor 14, and the third 71 is mounted approximately 5 feet from floor 14.

An elastic polyurethane band, circular in cross section and having a relaxed length of approximately 9 feet, extends through each loop in and supports curtain 36, 38. One end of each band is secured to a support clip on stanchion 30; the other end to the corresponding support clip on stanchion 32. Each is secured by passing the band through an oblong hole in the support clip and knotting the end to prevent it from pulling back through the hole. As shown, band 72 extends through loop 52, band 74 through loop 66, band 76 through loop 54, band 78 through loop 64, and band 80 through loop 68. Bands 74 and 76 are one-eighth inch in diameter; bands 72, 78 and 80 are three-sixteenths inch in diameter. The opposite ends of bands 72 and 74 are secured to clip supports 71; the opposite ends of bands 76 and 78 to clip supports 70; and the opposite ends of band 80 to clip support 69.

The vertical side edge portions of panels 50 and 60 are secured together and the vertical side edge portions 82, 84 of the entire access wall are secured to stanchions 30, 32 by Velcro brand tape fasteners. At stanchion 32, as shown in FIGS. 2—4, a hook tape 86 is mounted along the entire length of rod 100 of stanchion 32. Pile tapes 88, 90 are cemented and stitched respectively, along the inside of the vertical edges of upper curtain 36 and lower curtain 38. A short hook tape 92 extends along the outside side of the vertical edge of panel 50 of upper curtain 36. The full length of pile tape 88 engages hook tape 86. Pile tape 90 engages hook tape 86, or, where curtains 36 and 38 overlap, hook tape 92. Vertical edge 84 is similarly connected to stanchion 30.

Reference is now made to FIGS. 1 and 3 wherein the structure of end wall 22 is most clearly shown. As illustrated, end wall 22 includes a rigid wall section 120 adjacent sidewall 20 and a flexible wall section 122 adjacent sidewall 18. Rigid wall section 120 includes a rectangular frame, including side supports 124 and 126, upper support 128 and lower support 130, and, mounted therein, a double-door pass-through structure 132 and a pair of Lucite panels 134, 136. Side support 124 is connected by a full-length hinge 138 to the stanchion 140 at the adjacent end of sidewall 20. A latch 151 screwed on ceiling 12 engages side support 126 and holds rigid wall section in its closed position shown in FIG. 1.

Flexible wall section 122 comprises a flexible rectangular sheet 142 secured, by Velco brand tape fasteners, to stanchion 32, support 126, and a strip 144 of extended aluminum screwed in ceiling 12 and extending between stanchion 32 and support 126. Pile tapes 145, 147, and 149 are cemented and stitched along, respectively, the inside of the top horizontal edge 146 and (as viewed in FIG. 1) the left and right vertical edges 148, 150 of sheet 142. Cooperating hook tapes are mounted on the outwardly facing surfaces of support 126, strip 144, and stanchion 32. A supplementary tape fastener, comprising a pile tape 152 cemented and stitched on the outside of vertical edge 150 and a hook tape 154 mounted on the inner surface of stanchion 32, is also provided. The flexible sheets of sidewalls 18 and 20 and of end wall 22 are all Type 310 Clear Polyurethane Sheet, a highly transparent material having a minimum of optical distortion manufactured by B. F. Goodrich Corp. Panels 50 and 60 of sidewalls 18 and 20 have a thickness of 0.001 inch; the other polyurethane sheets are 0.002 inch in thickness. All the sheets are removably attached to their supporting stanchions and strips (by the previously described tape fasteners) so that they may be easily replaced or removed for sterilization.

Figure 5:
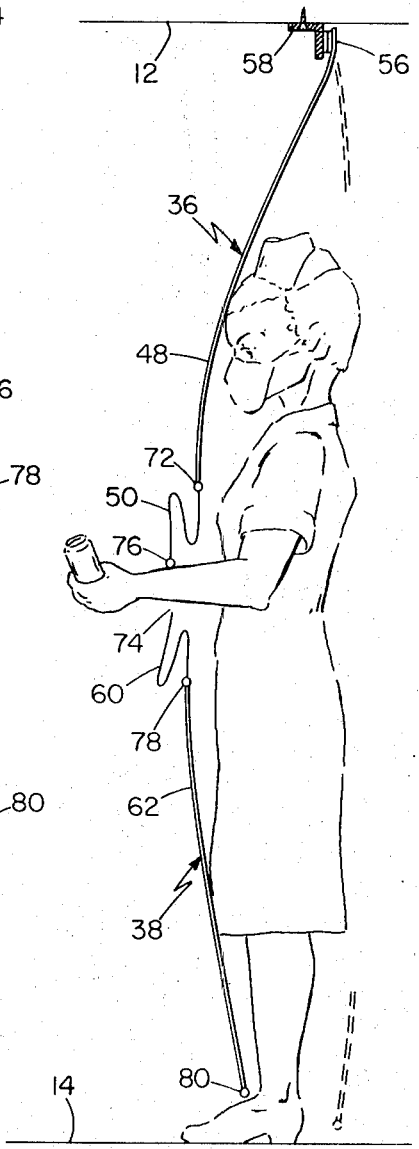

In operation, sterile air is forced into enclosure 10 through filters 24 in ceiling 12, flows downwardly through the enclosure, and is withdrawn through plenums 26 in floor 14. To prevent influx of unsterilized outside air into the enclosure, the interior of the enclosure is maintained at a slight positive pressure. The positive pressure, together with the force of bands 72, 74, 76, and 78, forces the overlapped portions of panels 50 and 60 together, providing the required low air leakage seal. Air loss is further reduced by overlapping curtains 36 and 38 so that the inside panel extends below the top edge of the outside panel. To treat a patient or carry out other work within enclosure 10, a person, such as the nurse illustrated in FIG. 5, inserts his arms through one of sidewalls 18, 20 at any point along the length of curtains 36, 38. As shown in FIG. 5, arm access is obtained by forcing band 74 at the top of panel 60 down, forcing band 76 at the bottom of panel 50 up, and inserting the arm between bands 74 and 76. The limit the size of the oval-shaped opening produced to that required to permit the nurses' arms to pass through the wall, insuring that the slight positive pressure within the chamber will be sufficient to prevent entry of outside air through the arm opening.

As shown in FIG. 5, a person may obtain arm access into the interior of enclosure 10 at any point along the full length of curtains 36 and 38. To treat a patient, or carry out other work within the enclosure, a person, such as the nurse illustrated in FIG. 5, forces band 74 at the top edge of panel 60 down, forces band 76 at the top edge of panel 50 up, and inserts his arms through the space between the bands. The force of the bands limits the size of the oval-shaped opening thereby produced to a size only slightly greater than that of the arms extending therethrough, thus insuring that the slight positive air pressure within the chamber is sufficient to prevent entry of contaminated outside air.

The fact, previously mentioned, that panels 50 and 60 have an overall length greater than the distance between stanchions 30 and 32 permits flexibility of the access wall inward, outward, and downward. In the illustrated embodiment, the overlapping portion of the access wall may be moved inwardly almost 2 feet, thereby greatly increasing the portion of the enclosure to which a person on the outside of the enclosure has access. As shown in FIG. 5, the lower edge of the access wall may also be moved inward about 2 feet, increasing both accessibility and the comfort of the person seeking access. The full-length access provided by each of the two access walls makes it possible for as many as four persons to work through the sidewalls into the enclosure at a single time.

Flexible wall section 122 provides a door, allowing a person to completely enter enclosure 10. The supplementary tape fastener previously described permits a person within enclosure to close this door from the inside by resealing the pile tape 152 on the outside vertical edge 150 of sheet 142 to the hook tape 154 on the inside of stanchion 32.

If an access door larger than that provided by flexible wall section 122 is required, the entire end wall 22 of the enclosure may be opened by first opening the tape fasteners at top edge 144 and vertical edge 150 of flexible sheet 142, and then releasing latch 15 and pivoting rigid wall section 120 about hinge 138.

Other embodiments within the scope of the following claims will occur to those skilled in the art.

I claim:
1. A wall structure comprising:
    a pair of overlapping flexible sheets; and, three longitudinally extending elastic bands;
    one of said sheets having a longitudinally extending edge portion secured along its length to a first one of said bands;
    the other of said sheets having a longitudinally extending edge portion overlying said one sheet and secured along its length to a second one of said bands;
    said second band being transversely spaced from said first band; and
    the third one of said bands being transversely spaced from said first band and being secured to said one sheet.

2. The wall structure of claim 1 wherein the portion of said one sheet intermediate said first band and said third band is of a lighter gauge than is another portion of said one sheet.

3. The wall structure of claim 1 wherein a pair of longitudinally extending transversely spaced elastic bands are secured to each of said sheets.

4. The wall structure of claim 3 wherein for each of said sheets, the portion of said each sheet intermediate the bands secured thereto is of lesser gauge than is a remaining portion of said sheet.

5. The wall structure of claim 1 including a pair of longitudinally spaced supports and wherein a transversely extending edge portion of each of said sheets is secured to each of said supports.

6. The wall structure of claim 5 wherein an end of each of said bands is secured to one of said supports.

7. The wall structure of claim 5 wherein the length of said longitudinal edge portion of each of said sheets is greater than the distance between said support.

8. The wall structure of claim 7 wherein a second longitudinally extending edge portion of one of said sheets is substantially equal in length to said distance.

9. The wall structure of claim 1 wherein said third elastic band is secured to said one sheet adjacent a second longitudinally extending edge portion thereof.

10. The wall structure of claim 9 including a pair of transversely spaced supports and wherein said sheets extend between said supports and the length of each of said longitudinal edge portions is greater than the distance between said supports.

11. The wall structure of claim 9 including a fourth longitudinally extending elastic band intermediate said first and said third bands and secured to said one sheet.

12. The wall structure of claim 11 including a fifth longitudinally extending elastic band transversely spaced from said second band and secured to said other sheet.

13. The wall structure of claim 12 wherein the portion of said one sheet intermediate said one band and said third band is of lesser gauge than is another portion of said one sheet, the portion of said other sheet intermediate said fifth band and said second band is of lesser gauge than is a remaining portion of said other sheet.

14. The wall structure of claim 13 including a pair of longitudinally spaced supports and wherein a transversely extending edge portion of each of said sheets is secured to each of said supports, transversely extending edge portions of overlapping portions of said sheets are secured to each other, and the length of each of said longitudinal edge portions is greater than the distance between said supports.

15. The wall structure of claim 1 wherein transversely extending edge portions of overlapping portions of said sheets are secured to each other.